Patented Sept. 11, 1923.

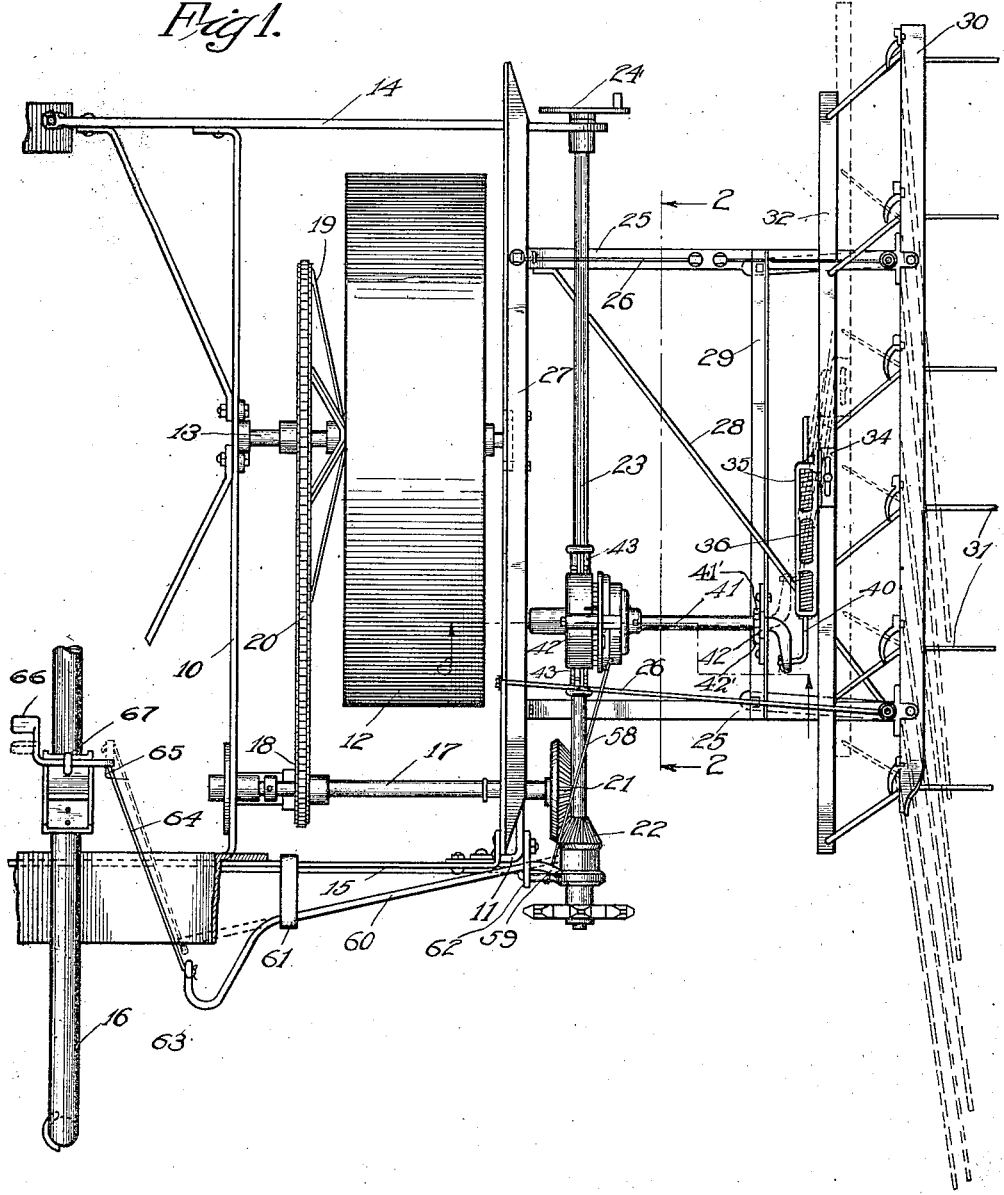

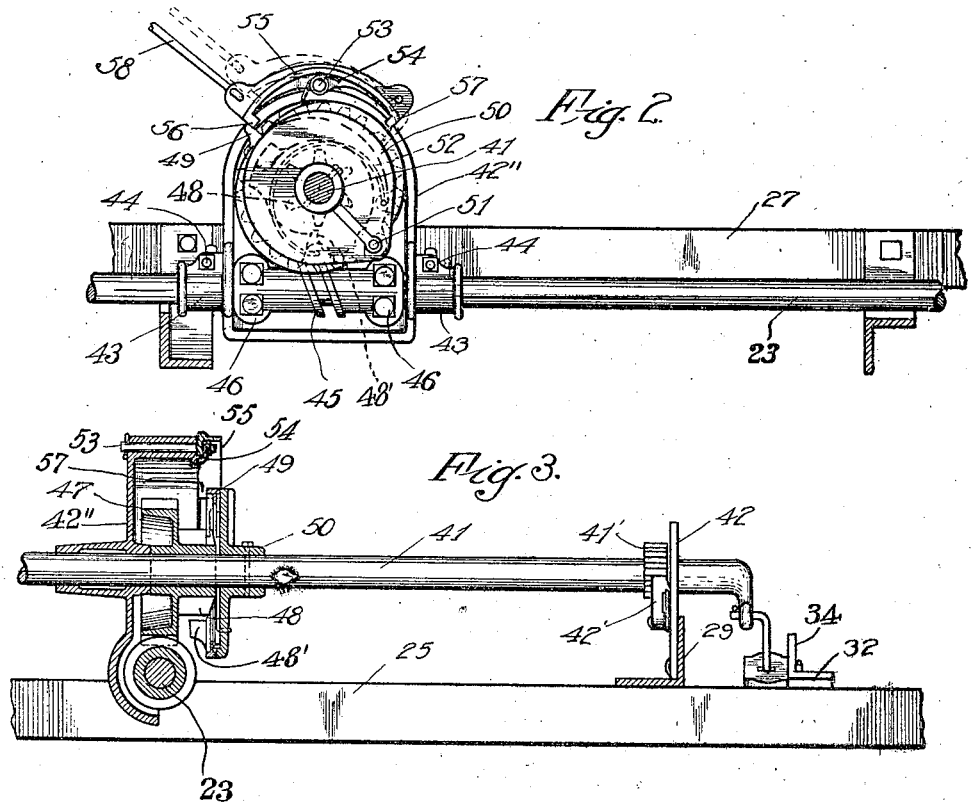
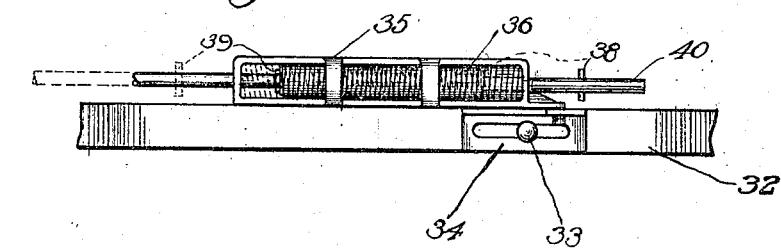
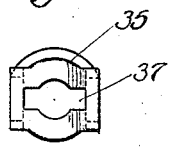

1,467,401

UNITED STATES PATENT OFFICE.

HERBERT B. SPERRY, OF CHICAGO, ILLINOIS, ASSIGNOR TO INTERNATIONAL HARVESTER COMPANY, A CORPORATION OF NEW JERSEY.

BUNDLE CARRIER.

Application filed November 26, 1919. Serial No. 340,851.

*To all whom it may concern:*

Be it known that I, HERBERT B. SPERRY, a citizen of the United States, residing at Chicago, in the county of Cook and State of Illinois, have invented certain new and useful Improvements in Bundle Carriers, of which the following is a full, clear, and exact specification.

My invention relates to bundle carriers for harvesters, and more particularly power operated means for controlling the carrier.

The invention has among its objects to provide power operated means connected to the traction wheel of a harvester, or to some other suitable source of power, for actuating the bundle carrier to sheaf-discharging position and returning the same to sheaf-receiving position after the load has been discharged.

A further object is to provide means under the control of the operator whereby the same is held in a dumping position for any desired length of time and to return the carrier by power to sheaf-receiving position.

A still further object is to provide a resilient double-acting connection between the power actuating means and the bundle carrier whereby the connection may yield in opposite directions when an obstruction is encountered by the bundle carrier, and thereby to prevent the breakage of the different parts. These and other objects are attained by means of mechanism such as a clutch mechanism for intermittingly connecting the bundle carrier with a power-operated shaft on the harvester, said mechanism being positively controlled by means such as a foot treadle mechanism whereby the operator may at will dump the carrier and return same to sheaf-receiving position by power derived from a suitable source, or may dump the carrier and hold same in dumping position and by means of power connection return the same to bundle-receiving position.

In the accompanying drawings I have illustrated one embodiment of my invention. In these drawings:

Figure 1—is a top plan view of the stubble-ward end of a harvester having attached thereto a bundle carrier and showing the connections between the carrier and traction wheel of the harvester;

Figure 2—is a sectional elevation view taken on the line 2—2 in Figure 1, showing the manner in which power-driven mechanism is mounted on the crank shaft of the harvester;

Fig. 3—is the sectional view taken on the lines 3—3 in Figure 1, showing details of the clutch mechanism;

Fig. 4—is in enlarged detail a view of the double-acting spring connection, and

Fig. 5—is an enlarged detail end view showing the yoke member.

The harvester, a portion of which is shown in Fig. 1, is of the standard type. It includes longitudinally disposed frame members 10 and 11, between which is mounted a traction wheel 12 on the shaft 13, and connecting the longitudinally disposed members are front and rear frame members 14 and 15.

The harvester is provided with the usual seat pipe 16 and a cross shaft 17, connected by means of sprockets 18 and 19 and chain 20 to the main axle 13 and driven by the traction wheel 12. The shaft 17 carries on the stubbleward end the usual gear 21, which meshes with a gear 22 carried by the crank shaft 23, which latter is provided at its front end with a crank disc 24 which can be connected to the cutting apparatus.

The bundle carrier proper is supported in the usual manner by laterally extending bars 25, which are braced by the rods 26 to the longitudinal frame member 27, vertically spaced from the frame member 11. Additional reinforcing rods 28 and cross members 29 are provided for connecting the laterally extending bars 25 which form a rigid support for a frame member 30 of the bundle carrier attachment.

The bundle carrier is made up of tines 31 provided on their grainward ends with integrally U-shaped extensions, the stubbleward leg of these extensions being pivotally secured to the frame member 30 in any well known manner and the other downwardlyextending leg being pivotally attached to a longitudinally reciprocable bar 32 for controlling the folding of the tines.

Means is provided for yieldingly retaining the bundle carrier both in the bundle-receiving position and in a folded position, thereby permitting the bundle carrier to yield in either position when the same encounters an obstruction and thus preventing the breaking of the different parts. These means comprise a bracket 34 adjustably fixed to the bar 32 by means of the bolt 33. Pivotally connected to this bracket 34 is a yoke member 35 which is provided with a frame construction embracing a double-acting spring 36. See Figures 4 and 5. This yoke is further provided with elongated openings 37 permitting the passage therethrough of pins 38 and 39 fixed to a reciprocable rod 40. These pins are normally held in contact with the outer ends of the spring 36 and in alignment with the ends of the yoke 35. The normal position of this double-acting connection is shown in full lines in Figure 1, and as the tines 31 of the bundle carrier encounter an obstruction by reason of the harvester moving forwardly, spring 36 is compressed by the pin 38 on the rod 40 passing through the aperture 37 on the forward end of the yoke member 35 to the position shown in the dotted lines in Figure 4.

If, on the other hand, an obstruction is encountered by the tines as the harvester is moving rearwardly, the spring 36 is compressed by the pin 39 on the rod 40, passing through the aperture 37 on the rear end of the yoke member 35 to the position shown in full lines in Figure 4.

The rear end of the rod 40 is pivotally connected to a supplemental crank shaft 41 journaled at its stubbleward end in bracket 42 fixed to the cross member 29. The other end of the shaft 41 is journaled in the bracket 42'', loosely mounted on the regular harvester crank shaft 23 of the harvester by means of two clamp members 43 secured to the bracket by means of bolts.

A spring pressed ratchet member 42' pivoted to the bracket 42 and adapted to engage the toothed member 41' fixed to the shaft 41 is provided to support and prevent reverse rotation of the crank shaft 41.

Attention is directed to the simple and efficient manner in which the clutch and drive mechanism is mounted, they being separate and independent from the harvester frame. This drive mechanism for actuating the bundle carrier comprises a worm 45 made up in two sections and clamped to the crank shaft 23 by means of bolts 46. The worm 45 meshes with and continuously drives the gear 47 journaled on the shaft 41. The gear 47, provided with a plurality of radially projecting teeth 48 adapted to engage projection 48' formed on the clutch member 49 pivoted at 51 to a drive member 50 fixed to the shaft 41.

The clutch member 49 by means of this projection 48' is adapted to engage the teeth 48 and is normally forced into engagement by means of a spring 52 when released by the locking member as shown in Figure 2. Pivoted to the bracket 42 at 53 and controlled by a spring 54 is a locking member 55 provided with two oppositely disposed lock engaging portions 56 and 57. The lock 56 normally engages the clutch member 49 and retains the bundle carrier in bundle-receiving position as shown in the full line in Figure 1. The lock 55 is controlled from the seat of the operator on the harvester by means of the connection 58 to a crank 59, formed integrally with the rock shaft 60, which is supported in the bearings 61 and 62. The grainward end of this rock shaft 60 is provided with a crank 63, which is connected by a rod 64 to a crank 65 formed integrally with the foot treadle 66 pivoted to the seat pipe 16 at 67. The operation of the mechanism above described is as follows:

When the parts are in position shown in full lines in Figures 1 and 2, the bundle carrier is in sheaf-receiving position. In order to dump the carrier the operator presses against the foot treadle 66 and by means of connecting links 64, 60, and 58, the lock 56 is raised. Referring to Figure 2, the clutch member 49 is forced into engagement with the gear 47 by the spring 52 and thereby the crank shaft 41 is rotated. As this crank shaft is rotated the bundle carrier is actuated to dumping position shown in dotted lines in Figure 1 by means of the rod 40, yoke 35 and bar 32.

During the operation of the bundle carrier from a sheaf-receiving position to a sheaf-discharging position and return to sheaf-receiving position, the crank completes a whole revolution, but if the foot treadle is depressed and is maintained in a depressed position, as shown in dotted lines in Figure 1, clutch member 49 will travel in approximately one-half revolution and will engage the lock 57 as shown in Figure 2, and the bundle carrier will be maintained in a partly folded position.

From the above detailed disclosure, it will be apparent that I have provided an efficient power connection between the traction wheel of the harvester and the bundle carrier attachment, whereby the latter is power controlled at the will of the operator. Shock absorbing or yielding means has also been provided whereby injury to the bundle carrier mechanism is obviated, should the carrier strike an obstruction in the field.

Having shown and described the preferred form of my invention, it is to be understood that this form is shown merely for the purpose of illustration and that other embodiments may be employed without departing from the spirit of my invention.

What I claim as new, and desire to secure by Letters Patent is:

1. In a harvester, a frame, a bundle carrier supported thereby, a crank shaft mounted on said frame, and power actuated means mounted on said crank shaft independent of said frame for actuating said carrier.

2. In a harvester, a frame, a power crank driven shaft journaled thereon, a bundle carrier carried thereby, power connections on said shaft independent of said frame, and means for controlling said power connections whereby said carrier may be power actuated.

3. In a harvester, a frame, a crank shaft journaled thereon, a bundle carrier carried thereby, and means forming a connection between said crank shaft and bundle carrier whereby said bundle carrier may yield relative to said crank shaft.

4. In a harvester, a frame, a crank shaft journaled thereon, a bundle carrier carried thereby, and means disposed between said crank shaft and bundle carrier whereby said bundle carrier may yield in a plurality of directions relative to said crank shaft.

5. In a harvester, a frame, a crank shaft journaled thereon, a bundle carrier carried thereby, and reversible means disposed between said crank shaft and bundle carrier whereby said bundle carrier may yield relative to said crank shaft.

6. In a harvester, a frame, a crank shaft journaled thereon, a bundle carrier carried thereby, and means comprising a reversible resilient pitman disposed between said crank shaft and bundle carrier whereby said bundle carrier may yield relative to said crank shaft.

7. In a harvester, a foldable bundle carrier, power actuated means for folding said carrier, and means including a resilient connection operatively connected to said power actuated means for retaining said carrier in a folded position.

8. In a harvester, a foldable bundle carrier, power actuated means for folding said carrier from bundle-receiving position to bundle-discharging position, and means including a connection between said power actuated means and said carrier for resiliently retaining said carrier in a bundle-receiving position.

9. In a harvester, a frame, a bundle carrier supported by said frame, power actuated means for actuating said carrier, and means connecting said power actuated means with said carrier whereby said carrier may yield relative to said power actuated means.

10. In a harvester, a frame, a bundle carrier supported by said frame, power actuated means for actuating said carrier, and reversible means whereby said carrier may yield when in its bundle receiving position relative to said power actuated means.

11. In a harvester, a frame, a bundle carrier supported by said frame, power actuated means for actuating said carrier, and means whereby said carrier may yield when in its bundle receiving position relative to said power actuated means in a plurality of directions.

12. In a harvester, a frame, a bundle carrier supported by said frame, power actuated means for actuating said carrier, means disposed between said carrier and said power actuated means comprising a yoke member, a reciprocable rod mounted therein, and a member for normally maintaining said yoke and rod in a fixed relation with respect to each other.

13. In a harvester, a frame, a bundle carrier supported by said frame, power actuated means for actuating said carrier, means disposed between said carrier and said power actuated means comprising a yoke member, a reciprocable rod mounted therein, and a resilient member for normally maintaining said yoke and said rod in a fixed relation with respect to each other.

14. In a harvester, a frame, a bundle carrier supported by said frame, power actuated means for actuating said carrier, means disposed between said carrier and said power actuated means comprising a yoke member, a reciprocable rod mounted therein, and means for permitting said rod to yield with respect to said yoke.

15. In a harvester, a frame, a bundle carrier supported by said frame, power actuated means for actuating said carrier, means comprising a yoke member connecting said carrier and said power actuated means, a reciprocable rod mounted therein, and a reversible means for permitting said rod to yield with respect to said yoke.

16. In a harvester, a frame, a bundle carrier supported by said frame, power actuated means for actuating said carrier, and means forming a pitman connection between said power actuated means and said carrier for permitting said bundle carrier to yield in a plurality of directions.

17. In a harvester, a frame, a bundle carrier supported by said frame, power actuated means for actuating said carrier, and means forming a pitman connection between said power actuated means and said carrier for permitting said bundle carrier to yield in opposite directions.

18. In a harvester, a frame, a bundle carrier, supported by said frame, power actuated means for actuating said carrier, and reversible means forming a pitman connection between said power actuated means and said carrier for permitting said bundle carrier to yield in a plurality of directions.

19. In a harvester, a frame, a bundle carrier supported by said frame, power actuated means for actuating said carrier, and resilient means forming a pitman connection between said power actuated means and said carrier for permitting said bundle carrier to yield in opposite directions.

20. In a harvester, a frame, a bundle carrier supported by said frame, power actuated means for actuating said carrier, means disposed between said carrier and said power actuated means comprising a yoke member, a reciprocable rod mounted therein, and means for permitting said rod to yield in a plurality of directions with respect to said yoke.

In testimony whereof I affix my signature.

HERBERT B. SPERRY.